US010021024B1

United States Patent
Crisp (10) Patent No.: US 10,021,024 B1
(45) Date of Patent: *Jul. 10, 2018

(54) PACKET REFLECTION IDENTIFICATION IN CPE DEVICES

(71) Applicant: ARRIS Enterprises, Inc., Suwanee, GA (US)

(72) Inventor: Russell Lee Crisp, Atlanta, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 712 days.

This patent is subject to a terminal disclaimer.

(21) Appl. No.: 13/798,055

(22) Filed: Mar. 12, 2013

Related U.S. Application Data (63) Continuation of application No. 12/579,026, filed on Oct. 14, 2009, now Pat. No. 8,396,065.

(60) Provisional application No. 61/196,212, filed on Oct. 16, 2008.

(51) Int. Cl.
*H04L 12/721* (2013.01)

(52) U.S. Cl.
CPC ................................. *H04L 45/72* (2013.01)

(58) Field of Classification Search
CPC ............ H04L 12/2898; H04L 12/2801; H04L 63/1441; H04L 61/6022
See application file for complete search history.

(56) References Cited

U.S. PATENT DOCUMENTS

| | | | |
|---|---|---|---|
| 6,697,862 B1 * | 2/2004 | Beser et al. | 709/226 |
| 6,839,355 B1 * | 1/2005 | Saby et al. | 370/401 |
| 2003/0039240 A1 * | 2/2003 | Sutanto | 370/352 |
| 2003/0123462 A1 | 7/2003 | Kusayanagi | |

OTHER PUBLICATIONS

Scott, "MAC Address duplicates," Nov. 18, 2004, https://www.wireshark.org/lists/ethereal-users/200411/msg00285.html.*

* cited by examiner

*Primary Examiner* — Jae Y Lee
(74) *Attorney, Agent, or Firm* — Stewart M. Wiener (57) ABSTRACT

Methods, systems, and apparatus can be used to filter packet reflections. In various implementations, packets received on a subscriber side of a device having a source address identifying a service provider device can be dropped. In other implementations, portions of packets forwarded to a subscriber side of a device can be cached and compared to portions of packets received on a subscriber side of the device.

17 Claims, 5 Drawing Sheets

PACKET REFLECTION IDENTIFICATION IN CPE DEVICES

CROSS-REFERENCE TO RELATED APPLICATIONS

This application claims priority as a continuation of U.S. patent application Ser. No. 12/579,026, entitled "Packet Reflection Identification in CPE Devices," filed on Oct. 14, 2009, and issuing as U.S. Pat. No. 8,396,065 on Mar. 12, 2013, which claims priority as a non-provisional conversion of U.S. Provisional Patent Application Ser. No. 61/196,212, entitled "Method for Preventing Packet Reflection from a DOCSIS CPE Device," filed on Oct. 16, 2008, each of which are incorporated herein by reference in their entirety.

TECHNICAL FIELD

This disclosure relates to packet reflection identification and handling.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

The provision of DOCSIS services typically includes distribution of CPE devices (e.g., cable modem (CM), media terminal adapter (MTA), embedded MTA (eMTA), set top box (STB), etc.) to subscribers. The CPE devices are operable to connect to subscriber equipment (e.g., home computers, telephones, televisions, wireless routers, etc.) and facilitate network communications across a hybrid fiber coax (HFC) network. CPE devices can be connected to myriad types of subscriber equipment and often experience a wide variety of performance related issues based upon the particular subscriber equipment to which the CPE devices are connected. Thus, there is a need to reduce performance related issues with regard to subscriber equipment interfaces.

SUMMARY

Systems and methods of this disclosure can operate to reduce packet reflection in CPE devices. Example methods can include the steps of: receiving an incoming data packet at a first network side of a customer premise equipment device; extracting a first address associated with origination of the incoming data packet; determining whether the first address associated with the incoming data packet matches a second address used to originate a previously received data packet at a second network side of the customer premise equipment device; and, dropping the incoming data packet if the first address matches the second address. Other embodiments of this disclosure include corresponding systems, apparatus, and computer program products.

Other example methods can include: capturing a first portion of provider originated data packets received on a service provider side of a customer premise equipment device; receiving an incoming subscriber side data packet from a subscriber equipment side of a customer premise equipment device; extracting a second portion of data from the incoming subscriber side data packet; determining whether the second portion of data extracted from the subscriber side data packet matches the first portion of data captured from provider originated data packets; and, identifying the incoming subscriber side data packet as a reflected packet if the second portion of data extracted from the subscriber side data packet matches the first portion of data captured from provider originated data packets. Other embodiments of this disclosure include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In some implementations of this disclosure, systems and methods can operate to filter packet reflection. Subscriber equipment, upon changing mode (e.g., powering down, going into or coming out of sleep mode, etc.), can occasionally cause some packets sent to the device to be reflected back to a CPE device. The CPE device would receive the packet from the subscriber equipment and register the source MAC address in a table of local area network (LAN) addresses. However, for data packets bridged from the WAN to the subscriber equipment, the reflected packet's source MAC address may correspond to a significant device on the WAN side of the CPE device. These devices include the CMTS, the router, the DHCP server, etc. The CPE device may have previously registered this source MAC address in a table of significant wide area network (WAN) addresses.

Figure 1:
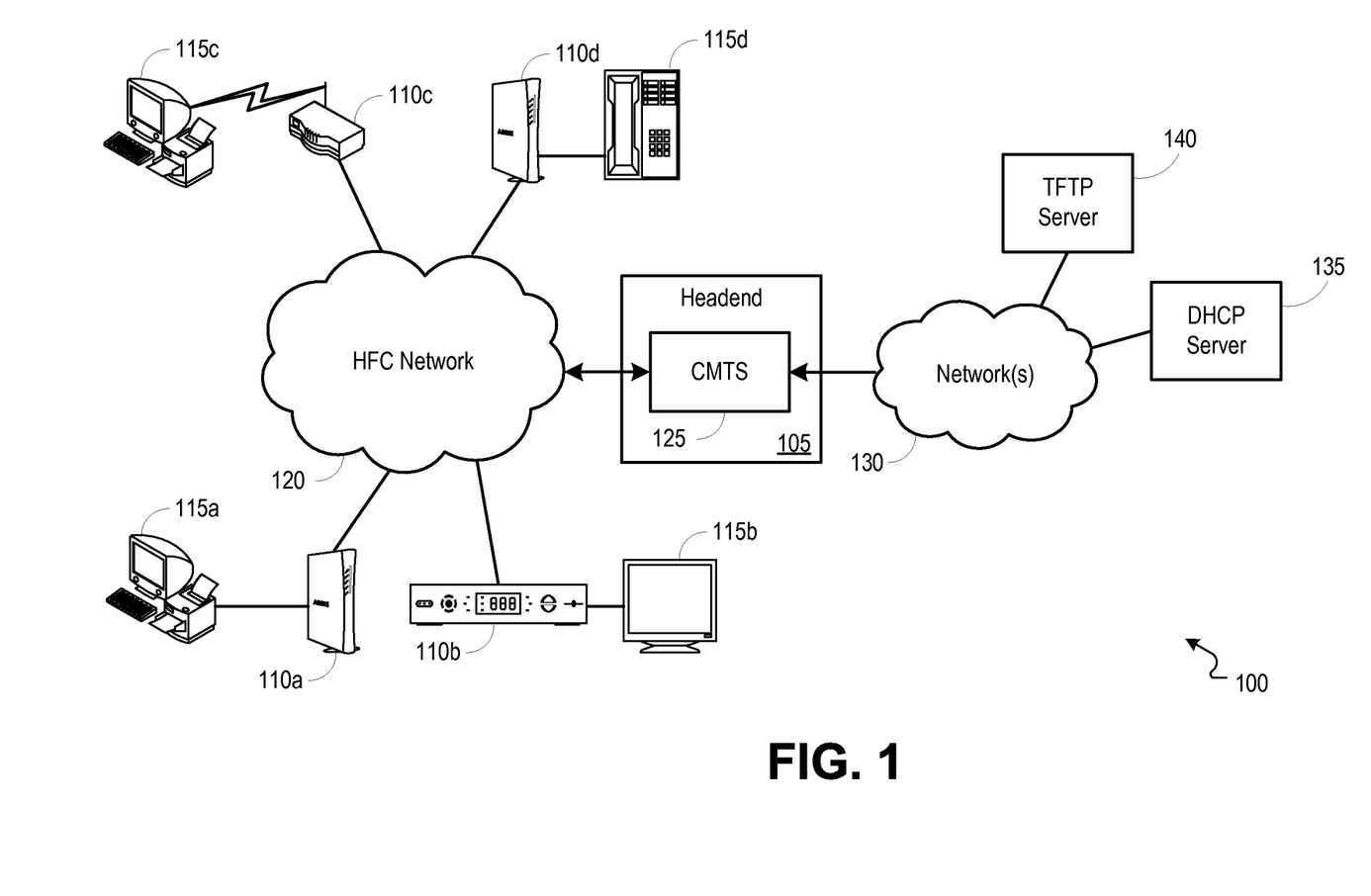
FIG. 1 is a block diagram illustrating an exemplary network environment operable to provide packet reflection identification.

FIG. 1 is a block diagram illustrating an exemplary network environment operable to provide packet reflection identification. In some implementations, a headend 105 can provide video, data and/or voice service(s) to customer premise equipment (CPE) devices 110*a-d* in one or more subscriber groups (e.g., service group(s)). The CPE devices can include, for example, a cable modem 110*a*, a set top box 110*b*, a wireless router including an embedded cable modem 110*c* or a media terminal adapter (MTA) 110*d*, among others. A cable modem 110*a* can facilitate communications from the headend 105 to a computer 115*a*. A set top box 110*b* can facilitate communications from the headend 105 to a television or a digital video recorder. A wireless router 110*c* can facilitate wireless communication with a computer 115c to a headend 105. An MTA 110d can facilitate communications between a telephone 115d to a headend 105.

The CPE devices 110a-d can communicate with the headend 105 via a hybrid fiber-coax (HFC) network 120. The headend 105 can include devices such as a cable modem termination system (CMTS) 125 and/or an edge quadrature amplitude modulation (EQAM) device (not shown), or a combined or converged device (not shown) including multiple edge and/or video or data processing functionalities. Such devices can operate to facilitate communications between a network 130 and the CPE device 110a-d. In various implementations, the network 130 can include one or more networks internal to the headend and/or one or more network external to the headend (e.g., one or more extranets, the Internet, etc.).

Data services can be handled by the headend 105 through a CMTS 120. The CMTS 125 can receive data signals from external device(s) or nodes through network(s) 130. The network(s) 130, for example, can operate using Internet protocol (IP), sending data packets to and receiving data packets from the headend 105. In some examples, the CMTS 125 can be paired with a SIP proxy server (not shown) operable to provide voice over internet protocol (VoIP) services with voice connectivity to other subscribers or voice connectivity to a public switched telephone network (PSTN) (not shown). In still further examples, one or more video sources may provide streaming data through the network(s) 130 to the CMTS 125.

In some implementations, the CMTS 125 can forward packets destined for subscribers to an EQAM device used to modulate the signal onto a carrier waveform. The carrier waveform can include both data and video streams, in both multicast and unicast (e.g., point-to-point) formats for transmission to a combiner, which can combine multiple signals onto a single fiber for transmission to one or more CPE devices 110a-d via the hybrid fiber-coax (HFC) network 120. In other implementations, the CMTS 125 can modulate a baseband signal to a carrier wave and transmit the signal to a combiner for upconversion to a transmission frequency.

When a CPE device 110a-d initially attempts connect to the headend 105, the device 110a-d goes through a channel scanning, ranging and registration process with the headend 105. The channel scanning process can include the CPE device 110a-d checking a nonvolatile data store for channels on which the device 110a-d previously managed a successful connection to the headend.

In some implementations, the CPE device(s) 110a-d can include a LAN address table (e.g., CPE table). The LAN address table can be operable to store a source MAC address when a packet is received at the device 110a-d from the LAN side of the CPE device (e.g., from a subscriber device 115a-d or other device networked to the CPE device or subscriber device). Thus, when new packets are received on the LAN side of a device 110a-d, the CPE device(s) 110a-d can determine whether the packet should be transferred to the WAN side of the device, or redirected back onto the LAN side, or dropped based upon the presence of the source MAC address in the WAN address table.

In some configurations it has been determined that subscriber devices 115a-d on the LAN side of the network can cause packet reflection back to respective CPE devices 110a-d. Such reflection can cause the incorrect entry of an address (e.g., a MAC address) into a LAN address table.

The CPE device 110a-d can filter reflected packets before the packets are stored in a LAN address table. In some implementations, the CPE device 110a-d can filter reflected packets by determining whether the packet's source MAC address already exists in a WAN address table. The WAN address table can be operable to store MAC address information associated with significant devices on the WAN side of the CPE device(s) 110a-d, such as the CMTS, the router, the DHCP server, the TFTP server, etc. Thus, if a packet is received from the LAN side of the CPE device with a source MAC address associated with the WAN side of the CPE device, the packet can be dropped. The packet can typically be dropped before the source MAC address is entered into the LAN address table.

In other implementations, the CPE device 110a-d can determine whether to filter a packet by storing a window of packets bridged from the WAN side of the CPE device to the LAN side of the CPE device, and comparing the packets received from the LAN side of the CPE device to the stored window of packets. If any of the packets received from the LAN side of the CPE device match the stored window of packets, the packets can be considered reflections of packets bridged from the WAN. Such packets can be filtered prior to entering the source MAC address of the packet into a LAN address table.

Figure 2:
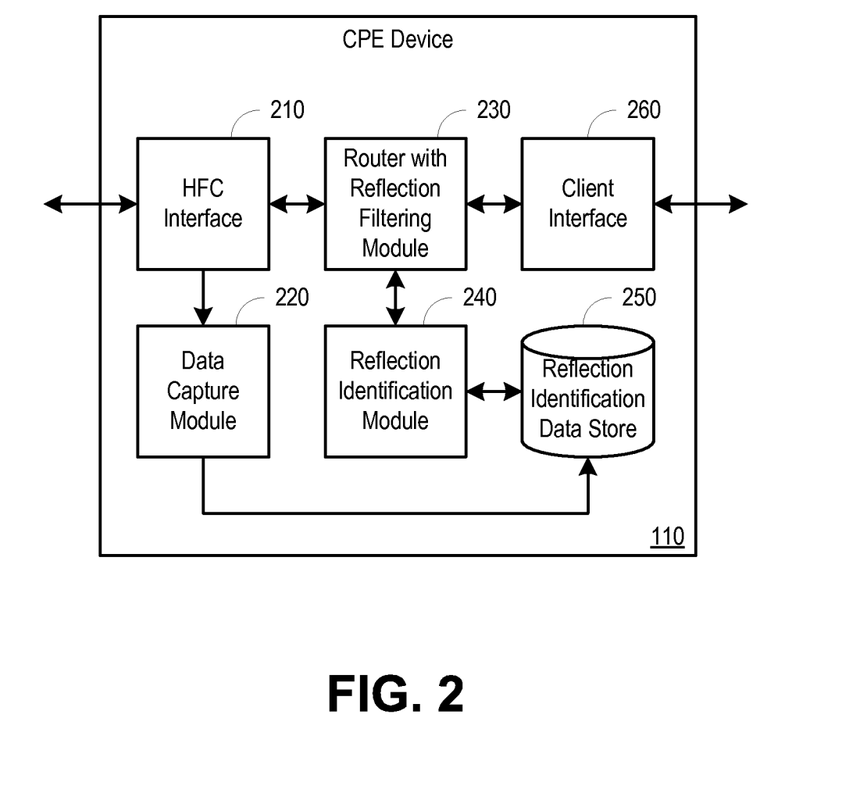
FIG. 2 is a block diagram illustrating a CPE device operable to provide packet reflection identification.

FIG. 2 is a block diagram illustrating a CPE device 110 operable to provide packet reflection identification. In some implementations, the CPE device 110 can include an HFC interface 210, a data capture module 220, a packet reflection filtering module 230, a packet reflection identification module 240, a packet reflection data store 250 and a client interface 260. The HFC interface 210 can be operable to receive communications from a headend or CMTS via an HFC network. The HFC interface can operate to receive modulated communications and, in some implementations, demodulate the data and provide the data to other modules within the CPE device 110. The packets received from the HFC can be received in an ethernet-encapsulated format, with a source MAC address, destination MAC address, and payload, among others.

The HFC interface can forward received packets to the data capture module 220 and to the packet filtering module 230. The data capture module 220 can be operable to capture data associated with the packet. In some implementations, the data capture module 220 can capture the source MAC address of the packet. In other implementations, the data capture module 220 can capture the entire packet. It should be understood that other portions of the packet, including the entirety of the packet, can be captured by the data capture module 220, depending on the implementation. The data captured by the data capture module 220 can be stored to a packet reflection data store 250.

The packet reflection filtering module 230 can receive data packets from the WAN (e.g., HFC) side of the CPE device and pass the packets to the LAN (e.g., CPE) side of the CPE device via the client interface 260. The client interface can be operable to receive WAN originated packets via the packet reflection filtering module 230 and receive LAN originated packets via a LAN connection.

Upon receipt of packets originated from the LAN, the client interface can demodulate the packet, if necessary, and pass the packet to the packet reflection filtering module 230. The packet reflection filtering module 230 can be operable to send LAN side packets to the packet reflection identification module to determine whether the packet is a reflected packet. As discussed above, some subscriber devices during a mode change can reflect packets back to the CPE device 110.

The packet reflection identification module 240 can be operable to identify packet reflection. In some implementations, the packet reflection module 240 can extract a portion of the packet (e.g., the source MAC address) and compare the portion of the packet to packet reflection identification data stored in a packet reflection identification data store 250. For example, the packet reflection identification data can be the same portion of a packet that was extracted from the incoming LAN communication. If the portion of the packet extracted from the packet matched the portion of a packet stored in the packet reflection identification data store 250, the packet is identified as a reflection by the packet reflection identification module 240 and is dropped (e.g., filtered) by the packet filtering module 230. Thus, for example, if the portion of the packet extracted is the source MAC address, the extracted source MAC address can be compared to source MAC addresses stored in the packet reflection identification data store 250. If the extracted source MAC address matched a source MAC address stored in the packet reflection identification data store 250, then the packet is dropped (e.g., filtered) by the packet filtering module 230, because the MAC addresses stored in the packet reflection identification data store 250 are already associated with WAN side devices.

In other implementations, the CPE device 110 can determine whether to filter a packet by storing a window of packets bridged from the WAN side of the CPE device to the LAN side of the CPE device in the packet reflection identification data store 250. Subsequently, packets received from the LAN side of the CPE device can be compared to the window of packets stored by the packet reflection identification module 240 in conjunction with the packet reflection identification data store 250. If any of the packets received from the LAN side of the CPE device match the stored window of packets in the packet reflection identification data store 250, the packets can be considered reflections of packets bridged from the WAN side of the CPE device. The packet reflection identification module 240 can notify the packet filtering module 230, and the packet filtering module 230 can filter the packets.

Figure 3:
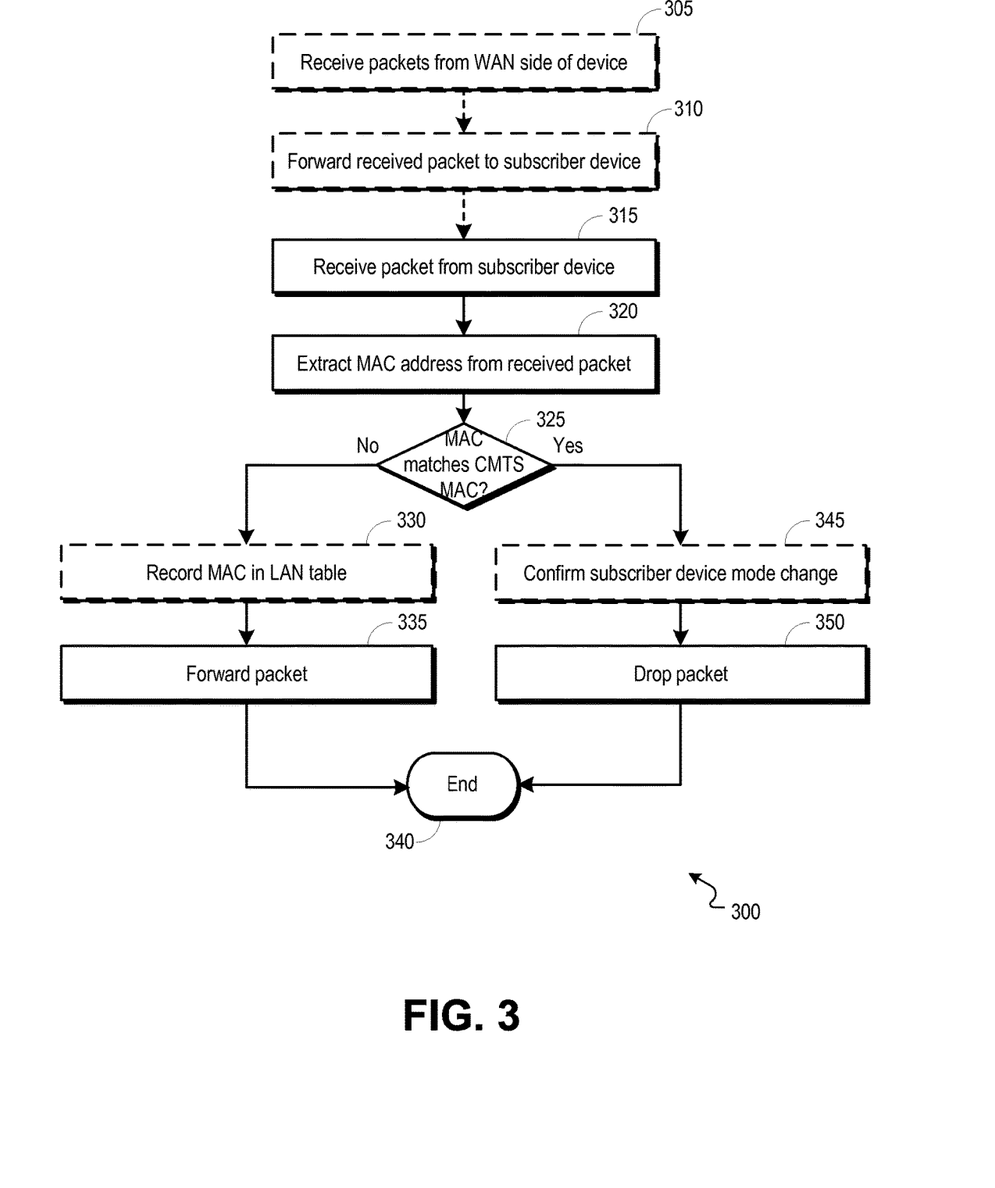
FIG. 3 is a flowchart illustrating an example process for packet reflection identification.

FIG. 3 is a flowchart illustrating an example process 300 for reflection identification. The process 300 optionally begins at stage 305, where a packet is received from a WAN side of a device. The packet can be received on a WAN side of a device, for example, by a WAN interface (e.g., HFC interface 210 of FIG. 2). In various implementations, the device can be a network bridge, operable to provide a bridge from one network to another. In other implementations, the device can be a network gateway, operable to translate protocols from one network and relay the communication in a different protocol on another network.

At optional stage 310, a received packet is forwarded to a subscriber equipment device. The received packet can be forwarded, for example, by a subscriber network interface (e.g., client interface 260 of FIG. 2). In some implementations, the process of forwarding the received packet to a subscriber device can cause a portion of the packet to be stored in a packet reflection identification table (e.g., packet reflection identification data store). The packet reflection identification table can be used to identify when a packet received on the LAN side is a reflection of a packet previously received on the WAN side and forwarded to a subscriber device.

At stage 315, a packet from a subscriber device is received. The packet can be received, for example, by a subscriber interface (e.g., client interface 260 of FIG. 2). In some implementations, the subscriber interface can be operable to demodulate and decode the packet prior to passing the packet to a packet reflection filter.

At stage 320, the source MAC address is extracted from the received packet. The source MAC address can be extracted from the received packet, for example, by a packet reflection filtering module (e.g., packet reflection filtering module 230 of FIG. 2).

At stage 325, a determination is made whether the extracted MAC address matches a MAC address stored in the WAN address table. The determination of whether the extracted MAC address matches the WAN address table can be made, for example, by a packet reflection identification module (e.g., packet reflection identification module 240 of FIG. 2) and a packet reflection identification data store (e.g., packet reflection identification data store 250 of FIG. 2).

If a determination is made that the extracted source MAC address does not match the WAN address table, the process 300 continues to optional stage 330, where the source MAC address is stored in a LAN address table. The source MAC address can be stored in a LAN address table, for example, by a WAN interface (e.g., HFC interface 210 of FIG. 2). The packet can then be forwarded at stage 335. The packet can be forwarded, for example, by a WAN interface (e.g., HFC interface 210 of FIG. 2). The process 300 then ends at stage 340.

If a determination is made that the extracted source MAC address matches the WAN address table, the process 300 continues to optional stage 345, where a subscriber device mode change can be confirmed. The subscriber device mode change can be confirmed, for example, by a packet filtering module (e.g., packet filtering module 230 of FIG. 2) via a subscriber interface (e.g., client interface 260 of FIG. 2). The packet can then be dropped at stage 350. The packet can be dropped, for example, by a packet filtering module (e.g., packet filtering module 230 of FIG. 2). The process 300 then ends at stage 340.

It should be noted that dashed lines can indicate optional stages that may or may not be included in various implementations of the disclosure. However, it should be noted that there are other stages that may be included or eliminated from the disclosed processes.

Figure 4:
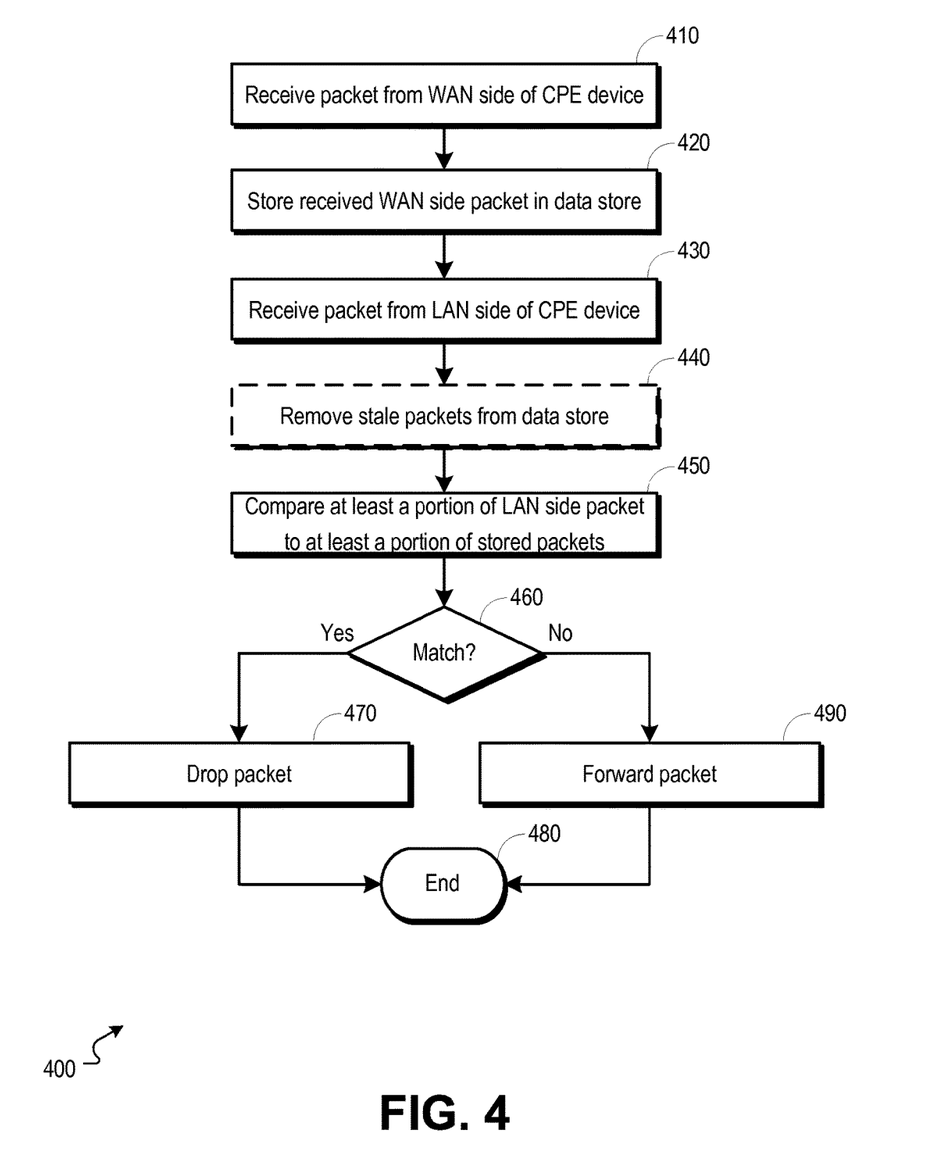
FIG. 4 is a flowchart illustrating another example process for packet reflection identification.

FIG. 4 is a flowchart illustrating another example process 400 for packet reflection identification. The process 400 begins at stage 410, where a packet is received from a WAN side of a device. The packet can be received on a WAN side of a device, for example, by a WAN interface (e.g., HFC interface 210 of FIG. 2). In various implementations, the device can be a network bridge, operable to provide a bridge from one network to another. In other implementations, the device can be a network gateway, operable to translate protocols from one network and relay the communication in a different protocol on another network.

At stage 420, a received packet is stored in a data store. The packet can be stored, for example, by a data capture module (e.g., data capture module 220 of FIG. 2) in conjunction with a data store (e.g., reflection identification data store 250 of FIG. 2). In some implementations, a portion of the received packet or an abstraction thereof can be stored in the data store. For example, the data capture module may store a payload associated with the receive packet, or a hash thereof.

At stage 430, a packet is received from the LAN side of the device. The packet can be received, for example, by a LAN interface (e.g., client interface 260 of FIG. 2). In some implementations, the LAN interface can be operable to demodulate and decode the data received, if necessary.

At optional stage 440, stale packets can be removed from the data store. Stale packets can be removed from the data store, for example, by a packet reflection identification module (e.g., packet reflection identification module 240 of FIG. 2), in conjunction with a data store (e.g., packet reflection identification data store 250 of FIG. 2). In some implementations, the stale packets can be identified by a period of time during which the packets have occupied the data store. For example, if a packet has occupied the data store for more than 3 milliseconds, the packet might be removed from the data store. In other implementations, the stale packets can be identified by a number of packets stored in the data store. For example, the data store may be limited to 10 data packets, and upon receipt of an 11th data packet, the oldest data packet in the data store can be removed.

At stage 450, at least a portion of the received LAN side data packet can be compared to at least a portion of the stored data packets. The comparison can be made, for example, by a packet reflection identification module (e.g., packet reflection identification module 240 of FIG. 2), in conjunction with a data store (e.g., packet reflection identification data store 250 of FIG. 2). In some implementations, the comparison can be made based upon the data in the packet. In other implementations, the comparison can be made based upon an abstraction of the data contained in the data packet (e.g., a hash of the data in the data packet).

At stage 460, a determination is made whether a match is identified. The determination can be made, for example, based upon a packet reflection identification module (e.g., reflection identification module 240 of FIG. 2). If a match is found, the process 400 can proceed to stage 470, where the packet is dropped. The packet can be dropped, for example, by a packet filtering module (e.g., packet reflection filtering module 230 of FIG. 2). The process 400 ends at stage 480. However, if no match is found, the process 400 can proceed to stage 490, where the packet is forwarded. The process 400 ends at stage 480.

Figure 5:
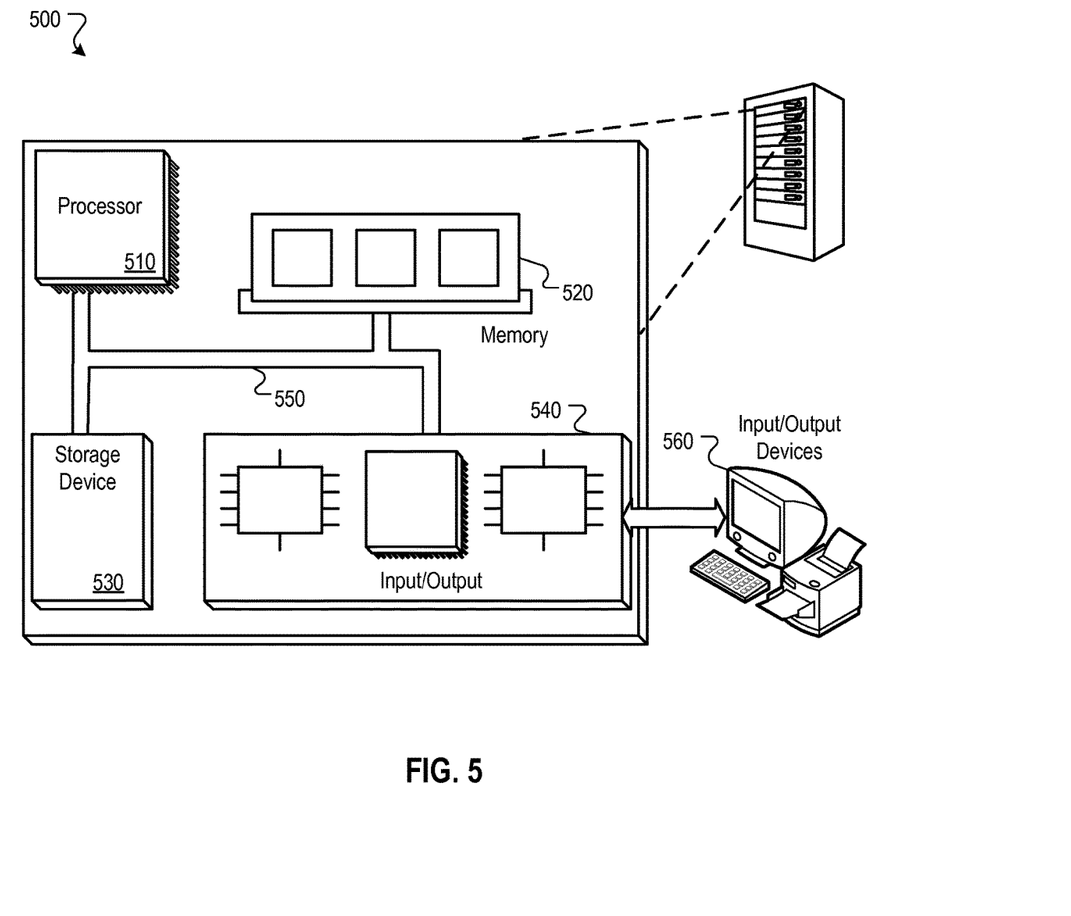
FIG. 5 is a block diagram illustrating a CPE device operable to provide packet reflection identification.

FIG. 5 is a block diagram illustrating a CPE device operable to provide packet reflection identification. The CPE device 500 can include a processor 510, a memory 520, a storage device 530, and an input/output device 540. Each of the components 510, 520, 530, and 540 can, for example, be interconnected using a system bus 550. The processor 510 is capable of processing instructions for execution within the device 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the device 500. In one implementation, the memory 520 is a computer-readable medium. In one implementation, the memory 520 is a volatile memory unit. In another implementation, the memory 520 is a non-volatile memory unit.

In some implementations, the storage device 530 is capable of providing mass storage for the device 500. In one implementation, the storage device 530 is a computer-readable medium. In various different implementations, the storage device 530 can, for example, include a hard disk device, an optical disk device, flash memory or some other large capacity storage device.

The input/output device 540 provides input/output operations for the device 500. In one implementation, the input/output device 540 can include one or more of a wireless interface, HFC network interface, such as, for example, an IP network interface device, e.g., an Ethernet interface, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks (e.g., subscriber device 560 and/or service provider network 570).

The CPE devices of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a digital signal processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
   receiving an incoming data packet at a first network side of a customer premise equipment device;
   extracting a first address associated with origination of the incoming data packet;
   determining whether the first address associated with the incoming data packet matches a second address used to originate a previously received data packet at a second network side of the customer premise equipment device; and
   dropping the incoming data packet if the first address matches the second address.

2. The computer-implemented method of claim 1, wherein a wide area network side of the customer premise equipment comprises a hybrid fiber coax network associated with a multiple service operator.

3. The computer-implemented method of claim 1, wherein the incoming data packet is a reflected data packet when the first address matches the second address.

4. The computer-implemented method of claim 3, wherein the second address is associated with one or more wide area network servers, including the cable modem termination system, router, quadrature amplitude modulation device, or other headend device.

5. The computer-implemented method of claim 1, wherein the second address is selected from a plurality of addresses associated with service provider equipment devices.

6. One or more computer-readable media having instructions stored thereon, the one or more computer readable media, when executed by a processor, cause the processor to perform operations comprising:
   receiving an incoming data packet from a subscriber equipment side of a customer premise equipment device;
   extracting a source media access control (MAC) address associated with the incoming data packet, the origination address identifying a subscriber device that originated the incoming data packet;
   determining whether the source MAC address associated with the incoming data packet matches a MAC address of any of one or more devices associated with a service provider side of the customer premise equipment device; and
   dropping the incoming data packet if the source MAC address matches the MAC address of any of the one or more service provider devices.

7. The computer readable media of claim 6, wherein a wide area network side of the customer premise equipment comprises a hybrid fiber coax network associated with a multiple service operator.

8. The computer readable media of claim 6, wherein the incoming data packet is identified as a reflected data packet when the origination address matches the MAC address of any of the one or more service provider devices.

9. The computer readable media of claim 8, wherein the MAC addresses of one or more service provider devices are associated with a cable modem termination system.

10. The computer readable media of claim 6, further comprising identifying the MAC address of one or more service provider devices based upon data packets received from a service provider side of the customer premise equipment device.

11. A computer-implemented method, comprising:
    capturing a first portion of provider originated data packets received on a service provider side of a customer premise equipment device;
    receiving an incoming subscriber side data packet from a subscriber equipment side of a customer premise equipment device;
    extracting a second portion of data from the incoming subscriber side data packet;
    determining whether the second portion of data extracted from the subscriber side data packet matches the first portion of data captured from provider originated data packets; and
    identifying the incoming subscriber side data packet as a reflected packet if the second portion of data extracted from the subscriber side data packet matches the first portion of data captured from provider originated data packets.

12. The computer-implemented method of claim 11, wherein the first and second portions comprise an originating address field extracted from a respective data packet.

13. The computer-implemented method of claim 11, further comprising dropping any incoming subscriber side data packets identified as a reflected packet.

14. The computer-implemented method of claim 11, further comprising:
    storing the first portion of provider originated data packets received on the service provider side of the customer premise equipment device to a provider side reflection identification store; and
    refreshing the reflection identification store to remove stale data.

15. The computer-implemented method of claim 14, wherein refreshing the reflection identification store to remove stale data comprises removing old entries into the reflection identification store responsive to new entries into the reflection identification data store.

16. The computer-implemented method of claim 14, wherein refreshing the reflection identification store to remove stale data comprises removing entries into the reflection data store that are older than a predetermined age.

17. A computer-implemented method, comprising:
    receiving a first data packet at a wide area network side of a customer premise equipment device;
    extracting a first address associated with origination of the first data packet;
    forwarding the first data packet onto a local area network side of the customer premise equipment device;
    receiving a second data packet at the local area network side of the customer premise equipment device;
    extracting a second address associated with origination of the second data packet;
    determining whether the first address associated with the first data packet matches a second address used to originate the second data packet; and
    dropping the incoming data packet if the first address matches the second address.

\* \* \* \* \*